US012808713B2

(12) United States Patent
Dierking

(10) Patent No.: US 12,808,713 B2
(45) Date of Patent: Nov. 24, 2026

(54) SYSTEM, METHOD, AND APPARATUS FOR DIGITAL HOLOGRAPHIC VIBRATION IMAGING WITH INTEGRAL SPARSE PRECISION TEMPORAL SAMPLING

(71) Applicant: Exciting Technology LLC, Dayton, OH (US)

(72) Inventor: Matthew P. Dierking, Springfield, OH (US)

(73) Assignee: Exciting Technology LLC, Dayton, OH (US)

( * ) Notice: Subject to any disclaimer, the term of this patent is extended or adjusted under 35 U.S.C. 154(b) by 0 days.

(21) Appl. No.: 19/064,086

(22) Filed: Feb. 26, 2025

(65) Prior Publication Data

US 2025/0198831 A1 Jun. 19, 2025

Related U.S. Application Data

(63) Continuation of application No. PCT/US2023/031993, filed on Sep. 5, 2023.

(Continued)

(51) Int. Cl.
*G01H 9/00* (2006.01)

(52) U.S. Cl.
CPC .................................... *G01H 9/00* (2013.01)

(58) Field of Classification Search
CPC ............... G03H 2001/0033; G03H 2001/0044
See application file for complete search history.

(56) References Cited

U.S. PATENT DOCUMENTS

| | | | |
|---|---|---|---|
| 6,385,215 | B1 | 5/2002 | Sumiyoshi |
| 7,787,131 | B1 | 8/2010 | Moran |

(Continued)

FOREIGN PATENT DOCUMENTS

| | | | |
|---|---|---|---|
| WO | 2023183078 | A2 | 9/2023 |
| WO | 2023183078 | A3 | 11/2023 |
| WO | 2024054444 | A1 | 3/2024 |

OTHER PUBLICATIONS

Gil Weinberg and Ori Katz, "100,000 frames-per-second compressive imaging with a conventional rolling-shutter camera by random point-spread-function engineering," Opt. Express 28, 30616-30625 (2020) (Year: 2020).*

(Continued)

*Primary Examiner* — Kara E. Geisel
*Assistant Examiner* — Chad Andrew Reverman
(74) *Attorney, Agent, or Firm* — GTC Law Group PC & Affiliates

(57) ABSTRACT

An example device includes a stable laser light source for master reference in a Doppler vibrometer scheme, a camera configured to receive scattered light from a target and a spatially offset reference beam, and a precision timer for acquisition control and data registration. The example device further includes an optical encoder configured to insert precision timing data into each image frame, and an acquisition system configured to acquire images from the camera, the images including the precision timing data. The example device includes an image processor configured to demodulate light from the acquired images via a digital holographic scheme, and to perform pulse-pair Doppler processing to determine vibration of the target, and optics configured to direct light from the light source to illuminate the target, to provide the reference beam, and to mix the reference beam with the received scattered light for holographic detection.

20 Claims, 12 Drawing Sheets

Related U.S. Application Data

(60) Provisional application No. 63/374,575, filed on Sep. 5, 2022.

(56) References Cited

U.S. PATENT DOCUMENTS

| | | | | |
|---|---|---|---|---|
| 9,581,967 | B1 | 2/2017 | Krause | |
| 12,045,010 | B2 | 7/2024 | Dierking et al. | |
| 12,282,340 | B2 * | 4/2025 | Levin | H04W 4/021 |
| 2002/0075562 | A1 | 6/2002 | Youn et al. | |
| 2004/0075891 | A1 | 4/2004 | Hwang et al. | |
| 2009/0046296 | A1 * | 2/2009 | Kilpatrick | G01H 9/004 356/484 |
| 2009/0304322 | A1 * | 12/2009 | Davies | G01M 11/3109 385/12 |
| 2010/0281986 | A1 | 11/2010 | Toal et al. | |
| 2011/0085230 | A1 | 4/2011 | Rapp et al. | |
| 2016/0238534 | A1 * | 8/2016 | Lau | G01H 9/002 |
| 2018/0058956 | A1 * | 3/2018 | Molin | G01D 5/35306 |
| 2019/0204275 | A1 * | 7/2019 | Hatahori | G01N 29/0654 |
| 2019/0250392 | A1 | 8/2019 | Cuche et al. | |
| 2020/0141715 | A1 | 5/2020 | Furman | |
| 2020/0401082 | A1 * | 12/2020 | Blodgett | A61B 5/0066 |
| 2022/0341319 | A1 * | 10/2022 | Duthie | E21B 43/103 |
| 2023/0130788 | A1 * | 4/2023 | Ozharar | G01H 9/004 385/12 |
| 2023/0175893 | A1 * | 6/2023 | Pepper | G01J 9/04 356/484 |
| 2024/0134314 | A1 | 4/2024 | Dierking et al. | |
| 2025/0093198 | A1 | 3/2025 | Dierking | |

OTHER PUBLICATIONS

"International Application Serial No. PCT/US2023/010855, International Preliminary Report on Patentability mailed Sep. 26, 2024", Exciting Technology LLC, 8 pages.

"International Application Serial No. PCT/US2023/010855, International Search Report and Written Opinion mailed Oct. 19, 2023", Exciting Technology LLC, 9 pages.

"International Application Serial No. PCT/US2023/031993, International Search Report and Written Opinion mailed Jan. 26, 2024", Exciting Technology LLC, 7 pages.

"International Application Serial No. PCT/US2023/031993, International Preliminary Report on Patentability mailed Mar. 20, 2025", Exciting Technology LLC, 6 pages.

* cited by examiner

1200

SYSTEM, METHOD, AND APPARATUS FOR DIGITAL HOLOGRAPHIC VIBRATION IMAGING WITH INTEGRAL SPARSE PRECISION TEMPORAL SAMPLING

CROSS-REFERENCE TO RELATED APPLICATIONS

This application claims priority to and is a continuation of International Application No. PCT/US2023/031993, filed 5 Sep. 2023, published as WO 2024/054444, and entitled "SYSTEM, METHOD, AND APPARATUS FOR DIGITAL HOLOGRAPHIC VIBRATION IMAGING WITH INTEGRAL SPARSE PRECISION TEMPORAL SAMPLING" (EXCT-0022-WO).

International Application No. PCT/US2023/031993 claims the benefit of U.S. Provisional Patent Application No. 63/374,575, filed on 5 Sep. 2022, and entitled "SYSTEM, METHOD, AND APPARATUS FOR DIGITAL HOLOGRAPHIC VIBRATION IMAGING WITH INTEGRAL SPARSE PRECISION TEMPORAL SAMPLING" (EXCT-0022-P01).

The foregoing applications are incorporated herein by reference in their entirety for all purposes.

BACKGROUND

Previously known vibrometry imaging systems suffer from a number of drawbacks. Limited measurement temporal accuracy and bandwidth are present in such systems, for example, due to camera frame rate limitations, camera timing instabilities or other system components that limit the sampling rate or accuracy. Limited measurement bandwidth present in imaging systems reduces the effective vibration measurement bandwidth, effective resolution, system power, system efficiency and imaging target size available for the system, thereby limiting the applications and performance outcomes for such systems. Some previously known systems do not have precision frame timing and do not compensate for timing inaccuracy, accepting the consequent resolution, and/or detection capability limits. Some previously known systems utilize uniform temporal sampling, accepting the consequent measurement bandwidth, and/or detection capability limits. Some systems employ special purpose focal planes which introduce significant cost and complexity in hardware configurations, and require additional processing and synchronization.

Referencing FIG. 1, an example previously known system for performing vibration imaging based on holographic detection is depicted. The example system includes a master oscillator 101, and a fiber splitter 102 that divides the master oscillator beam into an imaging beam (emitted from fiber terminator 103) and a local oscillator beam (emitted from fiber terminator 112). The imaging beam is transmitted to the target 105 through collimating optics 104. The reflected field is collected and scaled by a telescope 106, and the field stop 107 internal to the telescope limits the size of the target field. The reflected field is combined at mixer 108 with the spatially offset local oscillator collimated by a lens 113. A pupil stop 109 limits the size of the mixed pupil field and a relay lens 110 images the pupil field onto the camera 111 producing the real part of the holographic interferogram. In the example system, the camera runs at a specified frame rate and produces multiple frames of holographic data which is collected by the acquisition and processing system.

Referencing FIG. 2, an example of the holographic data detection process based on the example system 100 begins with the illuminated target 105 which has reflectivity and phase associated with surface roughness 201. The reflected field at the mixer 202 is cropped to the desired aperture size 103 and mixed with the local oscillator producing the mixed field 204. The relay lens 110 images and scales the mixed pupil onto the camera focal plane where real part of the hologram of the target is detected 204. The complex image is calculated by taking the two dimension Fourier transform of pupil resulting complex image pairs located in opposite quadrants 205 due to the modulation of the spatially offset local oscillator. Cropping out a single quadrant produces a complex image 206 which carries a phase at each image point that is proportional to the instantaneous range to target. For a vibrating target, the phase associated with each pixel changes over time. To measure the vibration, the holographic measurements are repeated over time to generate a stack of complex images representing the spatially resolved temporal phase history data (PHD) of the target 207.

Basic vibration is then applied for time record of each pixel. Pulse-pair, or doublet, processing was originally developed for radar Doppler processing, but was adapted for vibration sensing. FIG. 3 depicts the pulse-pair operation for a typical system with uniform temporal sampling where the measurement time is $T_s$=1/frame rate. For the each in the complex data volume 301, the complex image, S(x,y;n$T_S$), is given $$S(x, y; nT_s) = A(x, y; nT_s)e^{(j\varphi(x,y;nT_s))} \tag{1}$$

where the sampling interval is $T_S$=1/framerate, x and y are the spatial locations and A and ϕ are the amplitude and phase of each complex image location. The phase is the modulo-2π measurement of the range which is proportional to the current roundtrip range to the target, i.e., $\phi_n=4\pi(R)/4\lambda$. for the next pulse the range has increased depending of the surface velocity and the phase is $\phi_n=4\pi(R+VT_s)/4\lambda$.

In pulse-pair processing, the velocity of each pixel, v(x, y,n$T_s$), is found by taking derivative of the phase with respect to time for the sequence of complex images as $$\begin{aligned} v(x, y; nT_s) &= \frac{1}{2knT_s}\angle\{S(x, y; nT_s)S^*(x, y; (n+1)T_s)\} \\ &= \frac{1}{2kT_s}\angle\left\{A(x, y; nT_s)e^{(j\phi(x,y;nT_s))}A(x, y; (n+1)T_s)e^{(-j\varphi(x,y;(n+1)T_s))}\right\} \\ &= \frac{1}{2kT_s}\{\varphi(x, y; nT_s) - \varphi(x, y; (n+1)T_s)\} \end{aligned} \tag{2}$$

where k is the wave number of the laser and S, A and ϕ are the complex signal, amplitude and phase of each measured pulselet, respectively. For a given frame rate (FR), the sampling period, $T_s$=1/FR, is the time between the pulselets and determines the maximum temporal measurement bandwidth. The spatially resolved vibration spectra, V(x,y,$\omega_n$), is then calculated by taking the Fourier transform of the velocity time history with respect to time over each x, y pixel as $$V(x, y; \omega[n]) = \left|\frac{1}{2kT_s}FFT_t\{\varphi(x, y; (n)\,T_s) - \varphi(x, y; (n+1)\,T_s)\}\right|^{1/2} \tag{3}$$

The data volume V(x,y;$\omega_n$) contains the target vibration spectrum for each spatial location across the measurement field. The Nyquist frequency of the vibration spectra is limited by the sampling frequency to $FR/2=1/2T_s$, and all higher frequency vibrations will be aliased down into this band. This represents a severe limitation on digital holographic vibration imaging (DHVI) systems. In addition, certain fast framing cameras have readout structures that induce timing jitter between the frame rate and the actual frame capture time which is often a significant fraction of $T_s$. This jitter can cause severe degradations and artifacts in the measured spectra as depicted in FIG. 4. Finally, certain cameras have integration times, $T_I$, that may be orders of magnitude shorter than the frame time which could provide additional measurement bandwidth; however, the recorded timing information is only provided at the frame rate and is still subject to the frame capture timing jitter which is even larger with respect to the $T_I$.

SUMMARY

The temporal measurement bandwidth performance of digital holographic vibration imaging systems is driven by the frame rate, the timing accuracy of the camera, and the processing approach. In the present disclosure, non-uniform, sparse, high temporal precision sampling and non-uniform vibration image formation algorithms increase the measurement bandwidth and eliminate artifacts in the spectra. FIG. 5 depicts a certain implementation of a digital holographic vibration imaging system that provides non-uniform, sparse temporal sampling and processing to overcome the detector limitations and extend the temporal measurement bandwidth of DHVI systems.

In some aspects, the techniques described herein relate to a vibration image measurement system including: a stable laser light source for master reference in a Doppler vibrometer scheme; a camera configured to receive scattered light from target and a spatially offset reference beam; a precision timer for acquisition control and data registration; an optical encoder configured to insert precision timing data into each image frame; an acquisition system configured to acquire images from the camera, the images including the precision timing data; an image processor configured to demodulate light from the acquired images via a digital holographic scheme, and to perform pulse-pair Doppler processing to determine vibration of the target; and optics configured to direct light from the light source to illuminate the object, to provide the reference beam, and to mix the reference beam with the received scattered light for holographic detection.

In some aspects, the techniques described herein relate to a vibration image measurement system, wherein the precision timer is configured to trigger image acquisition at precision times randomly distributed around a maximum frame rate to create a sequence of sparsely spaced pupil plane images.

In some aspects, the techniques described herein relate to a vibration image measurement system, wherein the image processor is further configured to perform digital holographic detection and demodulation to create complex images containing the amplitude and phase for each image location.

In some aspects, the techniques described herein relate to a vibration image measurement system, wherein the precision timer is configured to generate camera frame acquisition signals with temporal precision equal to the integration time, and at the maximum frame rate.

In some aspects, the techniques described herein relate to a vibration image measurement system, wherein the precision timer information is encoded optically within each data frame as a digital signal.

In some aspects, the techniques described herein relate to a vibration image measurement system, wherein the digital signal includes a signal selected from: direct binary, gray code, or 2 dimensional pattern.

In some aspects, the techniques described herein relate to a vibration image measurement system, wherein the digital signal includes an optimized optical readout format.

In some aspects, the techniques described herein relate to a vibration image measurement system, wherein precision timing data is positioned in areas of the image frame blocked by a holographic aperture field stop.

In some aspects, the techniques described herein relate to a vibration image measurement system, wherein the image processor is further configured to perform holographic imaging to extract a complex image with amplitude and phase.

In some aspects, the techniques described herein relate to a vibration image measurement system, wherein the image processor is further configured to perform sparse pulse-pair Doppler processing to extract a phase signal from each location within a complex data volume.

In some aspects, the techniques described herein relate to a vibration image measurement system, wherein the image processor is incorporated in the camera.

In some aspects, the techniques described herein relate to a vibration image measurement system, wherein the image processor is further configured to perform holographic detection in the image plane.

In some aspects, the techniques described herein relate to a vibration image measurement system, wherein the light source to illuminate the object includes an amplified laser.

In some aspects, the techniques described herein relate to a vibration image measurement system, wherein image processor is further configured to measure and correct the systematic phase perturbations.

In some aspects, the techniques described herein relate to a vibration image measurement system, wherein light source to illuminate the object includes a pulsed laser.

In some aspects, the techniques described herein relate to a vibration image measurement system, wherein the camera provides precision timing, and wherein the image processor is further configured to perform holographic detection in the image plane.

In some aspects, the techniques described herein relate to a vibration image measurement system, wherein the optical encoder is further configured to encode the precision timer information within each data frame as an analog signal.

In some aspects, the techniques described herein relate to a vibration image measurement system, wherein the optical encoder is further configured to encode the precision timer information within each data frame as a combination of analog and optical signals.

In some aspects, the techniques described herein relate to a system, including: a stable laser light source for master reference in a Doppler vibrometer scheme; a camera configured to receive scattered light from target and a spatially offset reference beam; a precision timer for acquisition control and data registration; a means for encoding precision timing data into each image frame; and a means for determining vibration information of the target, wherein the vibration information includes vibration modes at a frequency exceeding F/2, wherein F is the frame rate of the camera.

In some aspects, the techniques described herein relate to a system, wherein the means of determining vibration information of the target includes a means for determining vibration information at a rate up to $1/2T_I$, wherein $T_I$ includes the integration time of the camera.

Certain further aspects of the example apparatus are described following, any one or more of which may be present in certain embodiments.

DETAILED DESCRIPTION

Figure 1:
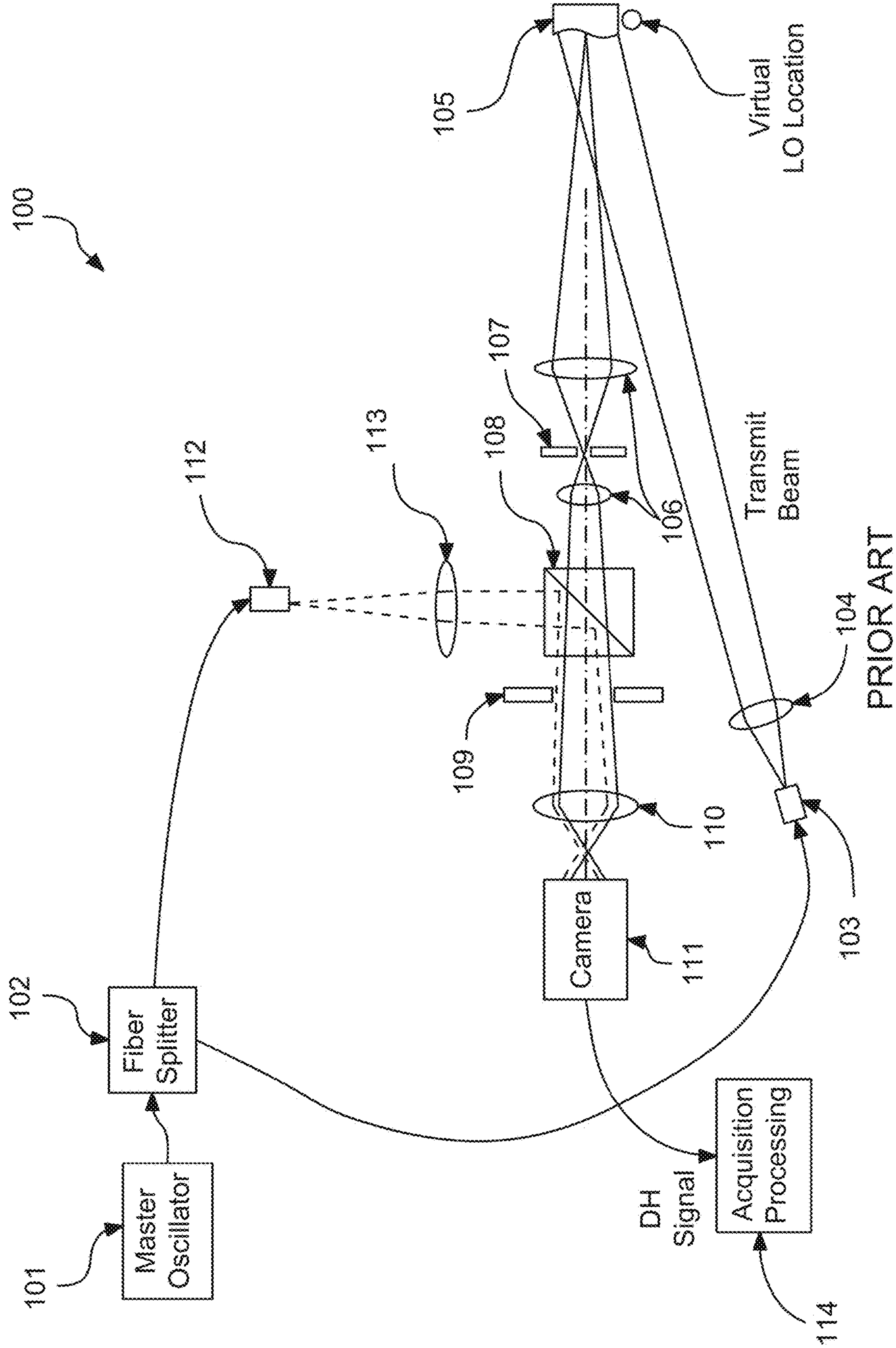
PRIOR ART FIG. 1
FIG. 1 shows a schematic depiction of a previously known for an imaging vibrometer system.
Figure 2:
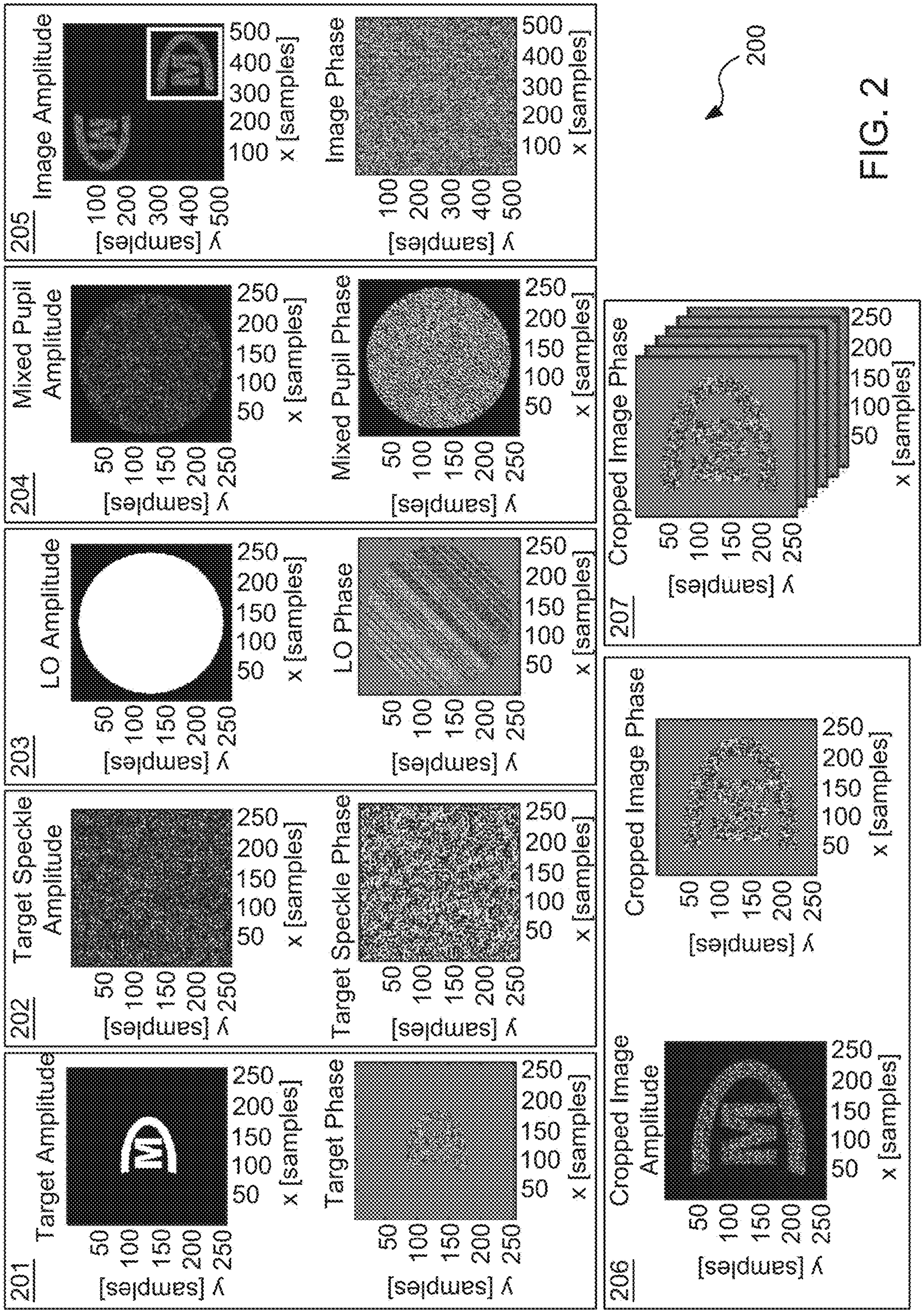
FIG. 2 shows an example digital holographic vibration imaging lidar detection scheme.
Figure 3:
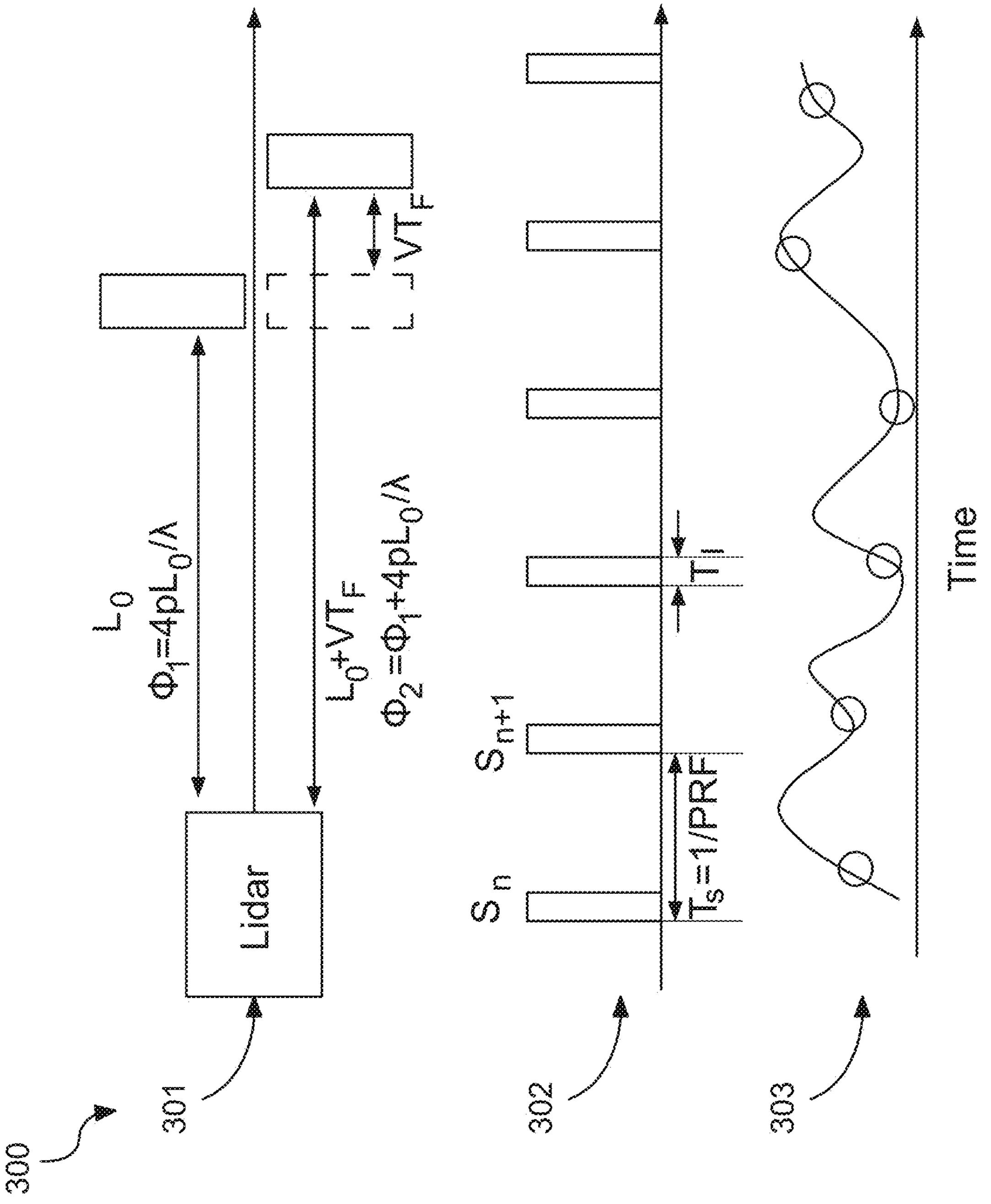
FIG. 3 depicts basic pulse-pair Doppler processing for a uniform sample signal.
Figure 4:
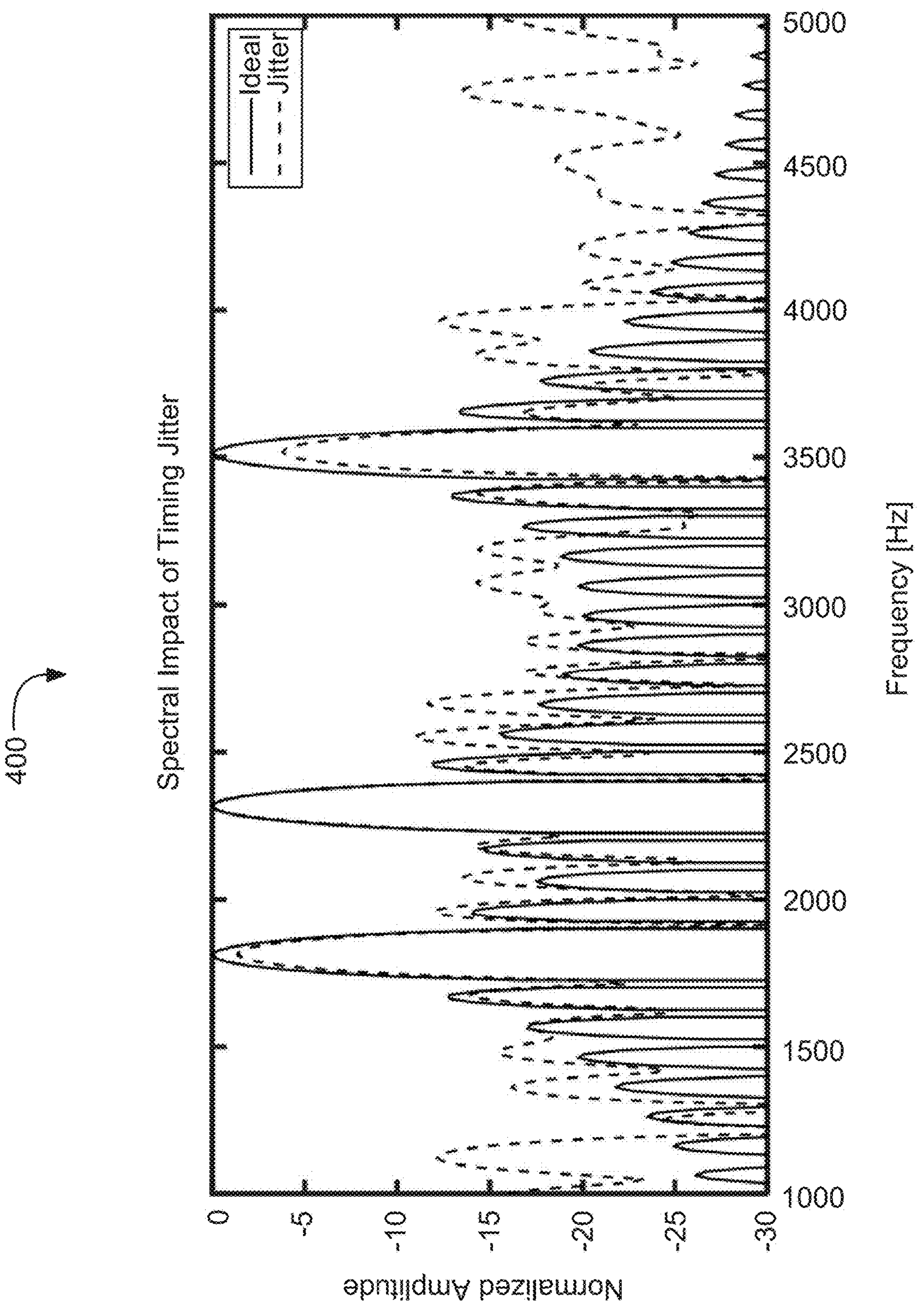
FIG. 4 depicts illustrative degradations in a measured spectra for a uniform sample signal.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles disclosed herein as would normally occur to one skilled in the art to which this disclosure pertains.

Figure 5:
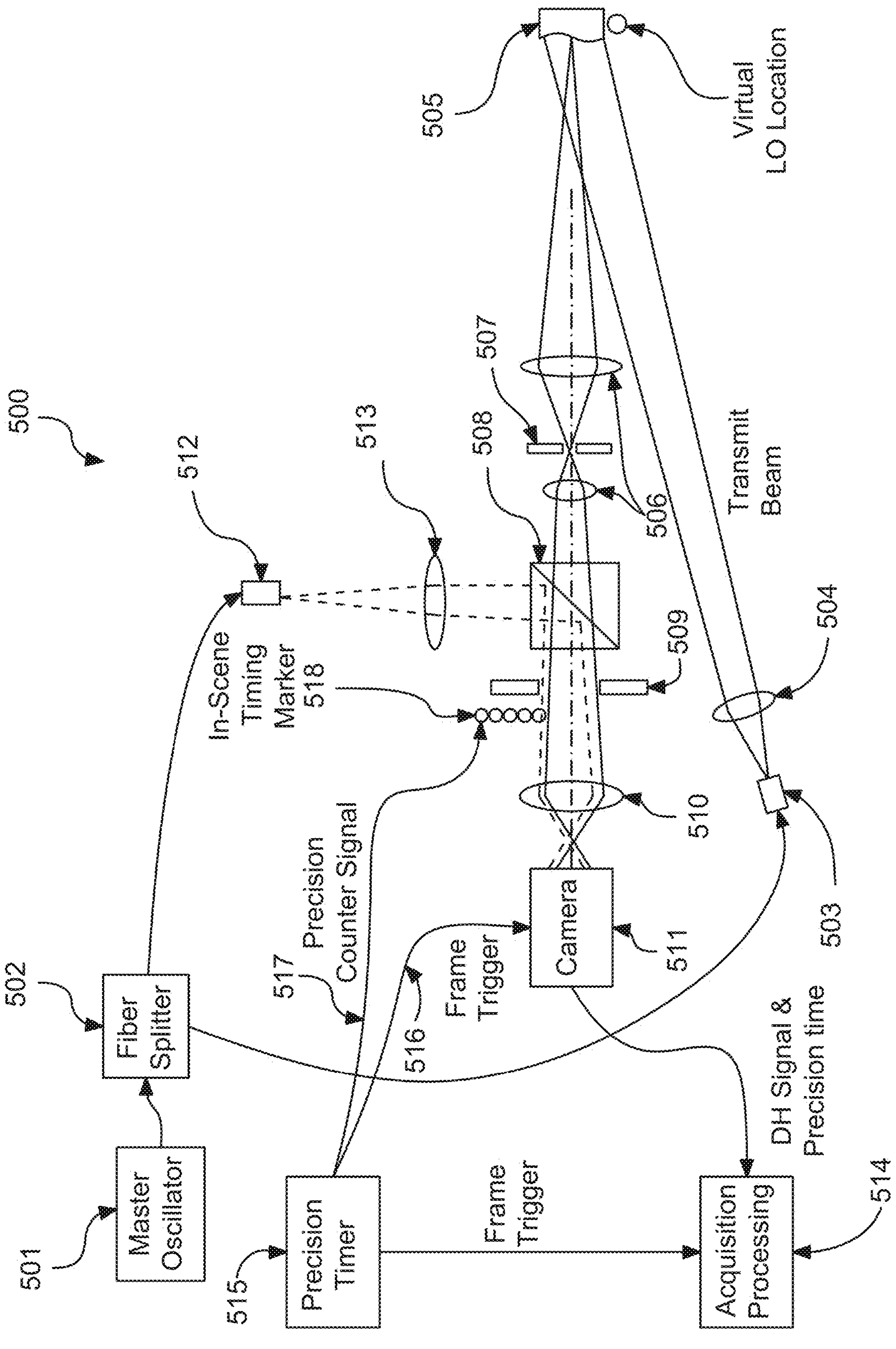
FIG. 5 shows a certain sparse DHVI embodiment with in-scene precision timing according to embodiments of the present disclosure.

Referencing FIG. 5, an example embodiment of a system 500 for performing vibration imaging based on holographic detection is schematically depicted. The example system includes a master oscillator 501, and a fiber splitter 502 that divides the master oscillator beam into an imaging beam (emitted from fiber terminator 503) and a local oscillator beam (emitted from fiber terminator 512). The imaging beam is transmitted to the target 505 through collimating optics 504. The reflected field is collected and scaled by a telescope 506, and the field stop 507 internal to the telescope limits the size of the target field. The reflected field is combined at mixer 508 with the spatially offset local oscillator collimated by a lens 513. A pupil stop 509 limits the size of the mixed pupil field and a relay lens 510 images the pupil field onto the camera 511 producing the real part of the holographic interferogram. In the example embodiment, a Precision Timer 515 is added to trigger the camera frame acquisition 516 near the maximum frame rate of the camera, but with each frame time randomly dithered over a frame time $T_S$ to facilitate sparse, precision sampling. A precision counter signal 517 is provided to place in-scene timing markers 518 that optically encode the precise time of imaging frames.

Figure 6:
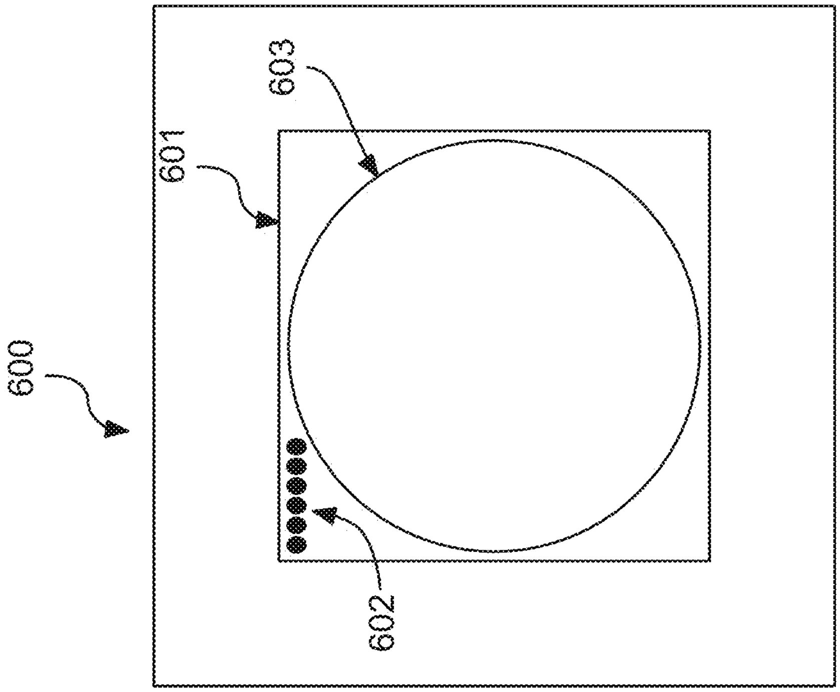
FIG. 6 is a schematic depiction of an example DHVI embodiment with in-scene precision timing markers according to embodiments of the present disclosure.

Referencing FIG. 6, an example image 600 is constructed using the precision digital counter signal 517 is provided to drive optical indicators 602 (e.g., as in-scene timing markers 518) located in the shadowed regions of the pupil stop 601. Both the pupil and the optical indicators are imaged onto the camera by the relay lens 510 recording the both the holographic data within the unshadowed regions of the pupil stop 603 and the precision time of the frame.

The example embodiment uses a digital signal to optically encode the precision time in each frame. There are multiple encoding embodiments that could provide optically coded timing information, such as, without limitation, timed intensity ramps, ratiometric intensity measures, and/or spatially distributed timing signals. All of the example methods provide the needed precision timing information independent of the capability of the camera. Any encoding operations that optically encode the precision time into each frame are contemplated herein.

Figure 7:
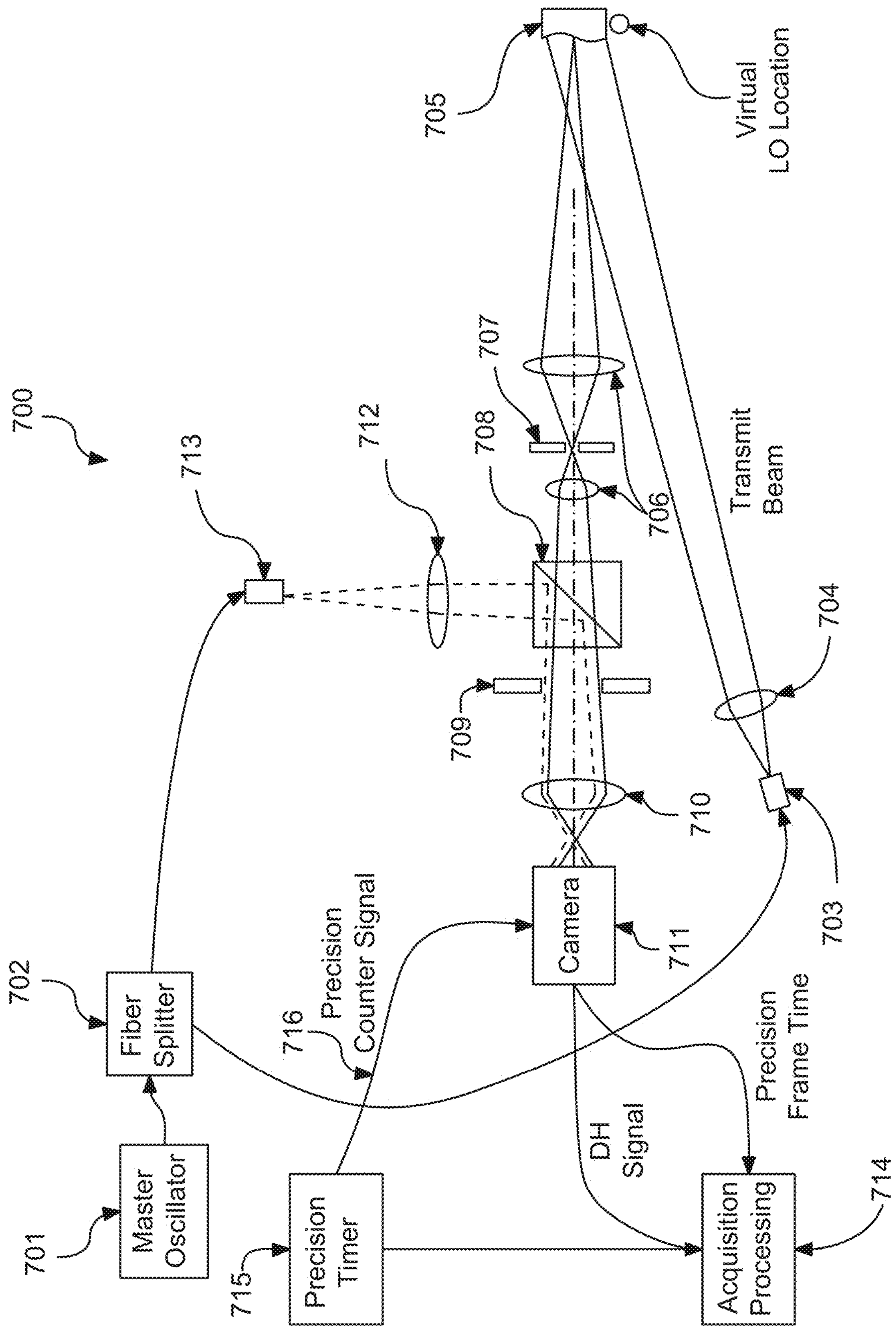
FIG. 7 shows a certain sparse DHVI embodiment with electronic precision timing according to embodiments of the present disclosure.

Referencing FIG. 7, another example system 700 for sparse sampling timing could be utilized if the camera includes the necessary precision timing electronics. Similar to the example of FIG. 5, the system 700 includes a master oscillator 701, and a fiber splitter 702 that divides the master oscillator beam into an imaging beam (emitted from fiber terminator 703) and a local oscillator beam (emitted from fiber terminator 713). The imaging beam is transmitted to the target 705 through collimating optics 704. The reflected field is collected and scaled by a telescope 706, and the field stop 707 internal to the telescope limits the size of the target field. The reflected field is combined at mixer 708 with the spatially offset local oscillator collimated by a lens 712. A pupil stop 709 limits the size of the mixed pupil field and a relay lens 710 images the pupil field onto the camera 711 producing the real part of the holographic interferogram.

In the example of FIG. 7, the precision timer 715 provides a similarly dithered frame acquisition signal 716 to the camera. If possible, the camera could provide precision timing information either through digital readout or output sync pulses where the time of the pulse is measured and reported by the Acquisition and Processing system 714. To be effective, the measured times must have precision on the order of the integration time.

Figure 8:
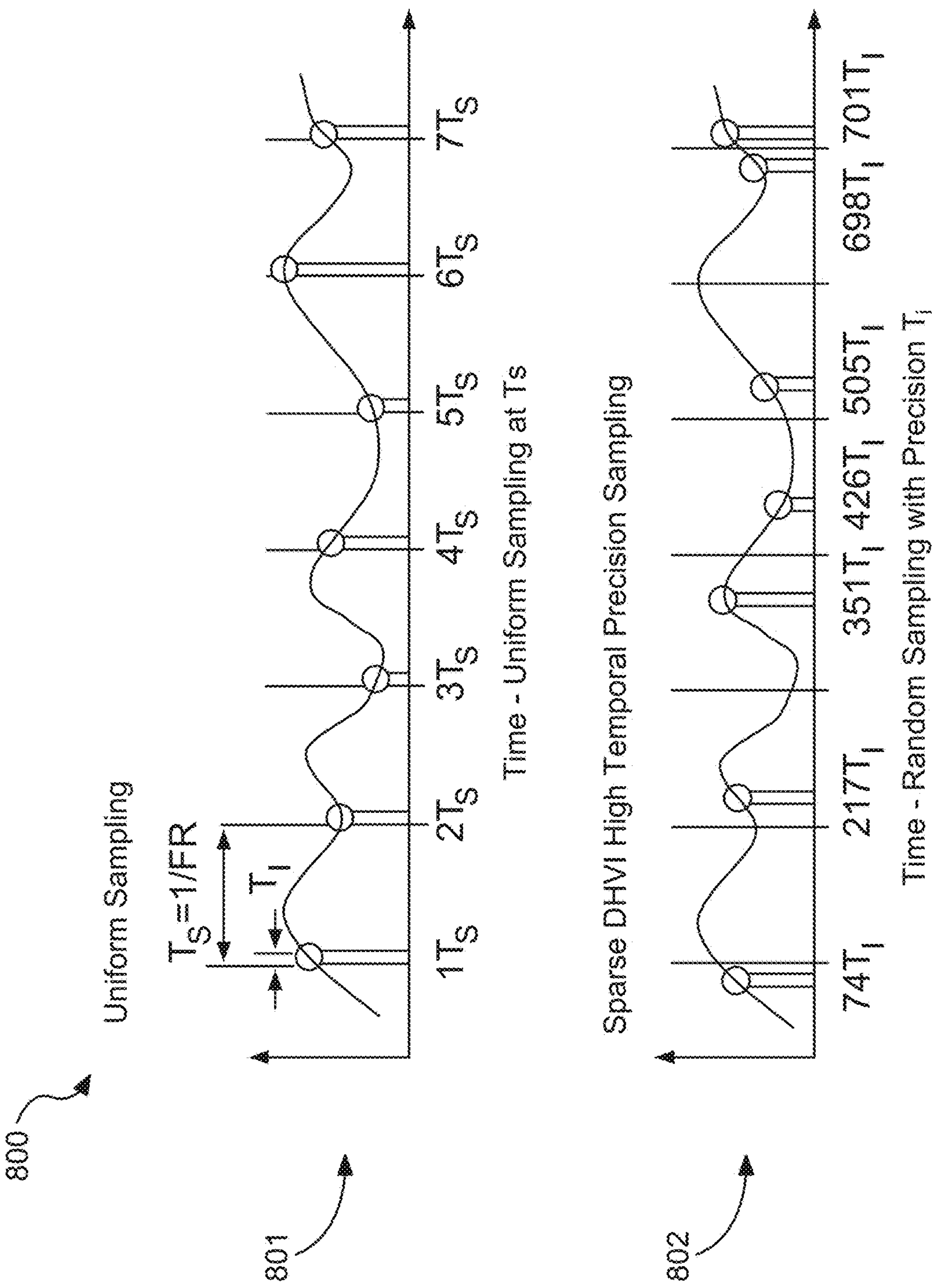
FIG. 8 shows an illustrative comparison of a uniform and sparsely sampled temporal signal.

The embodiments of FIG. 5 and FIG. 7 demonstrate a path to recording sparse, precision temporally sampled holographic data. To exploit the precision timing, an example pulse-pair algorithm is set forth herein. Reference FIG. 8, uniform sampling 801 at the frame rate FR produces a minimum sampling interval of Ts=1/FR corresponding to a maximum Nyquist frequency bandwidth, $BW=FR/2=1/2T_S$. The camera integration time, $T_I$, is typically 50 to 100 times less than $T_s$, so the achievable timing precision increased by the same factor. The detector array is still limited to the defined maximum FR due to the finite readout time of each frame. To implement the non-uniform sampling 802, the time of each frame acquisition is varied such that, the measurement time of each frame is distributed between $T_s$ and $2T_s$, but with the precision of $T_I$. The maximum temporal measurement bandwidth is now limited by the measurement precision or integration time to $BW=1/2T_I$.

Figure 9:
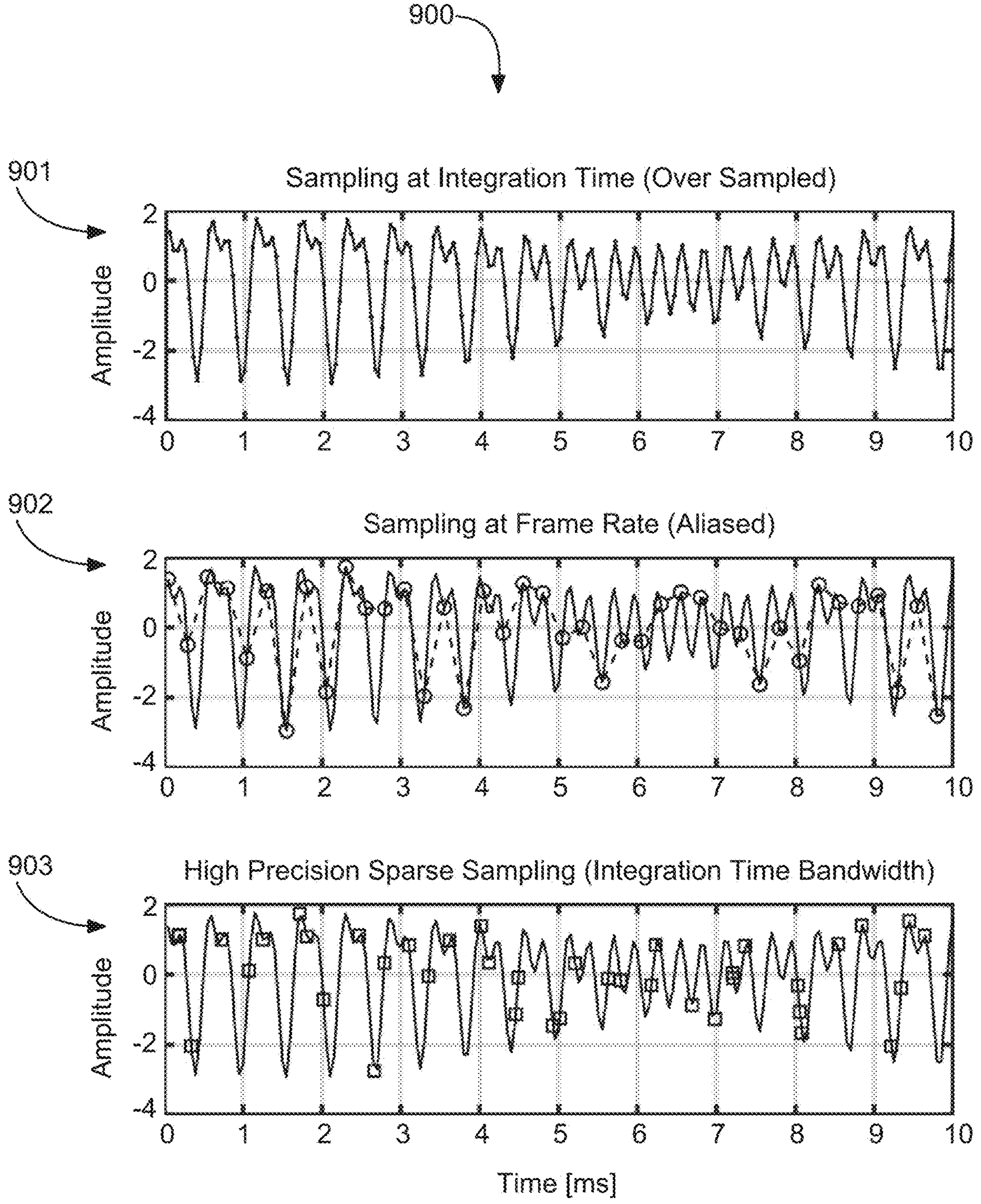
FIG. 9 shows a signal uniformly sampled at the integration time and frame time and the signal sparsely sampled and the precision of the integration time.

To illustrate the sampling impact of the non-uniform sampling, FIG. 9 shows illustrative phase histories for three cases. The three sinusoid frequencies were chosen to be within the Nyquist limit for the integration time $T_I$, but some are aliased for uniform sampling at the frame rate $FR=1/5T_I$. For the sparsely sampling signal at precision $T_I$, the measurement bandwidth is effectively increased to $T_I$, although the full signal is then reconstructed using sparse data reconstruction techniques. Specifically in FIG. 9, graph 901 depicts sampling at the integration time $T_I$, to illustrate the true characteristics of the illustrative data. Graph 902 depicts uniform sampling at Ts, which is subject to aliasing and limited to the Nyquist bandwidth of the frame rate. It can be seen that significant loss of signal is present in graph 902. Graph 903 depicts non-uniform sampling, which can detect features detectable at the integration time $T_I$, which is typically much faster than the frame rate, and which detects features in FIG. 9 that are lost in the uniform sampling 902 example.

Figure 10:
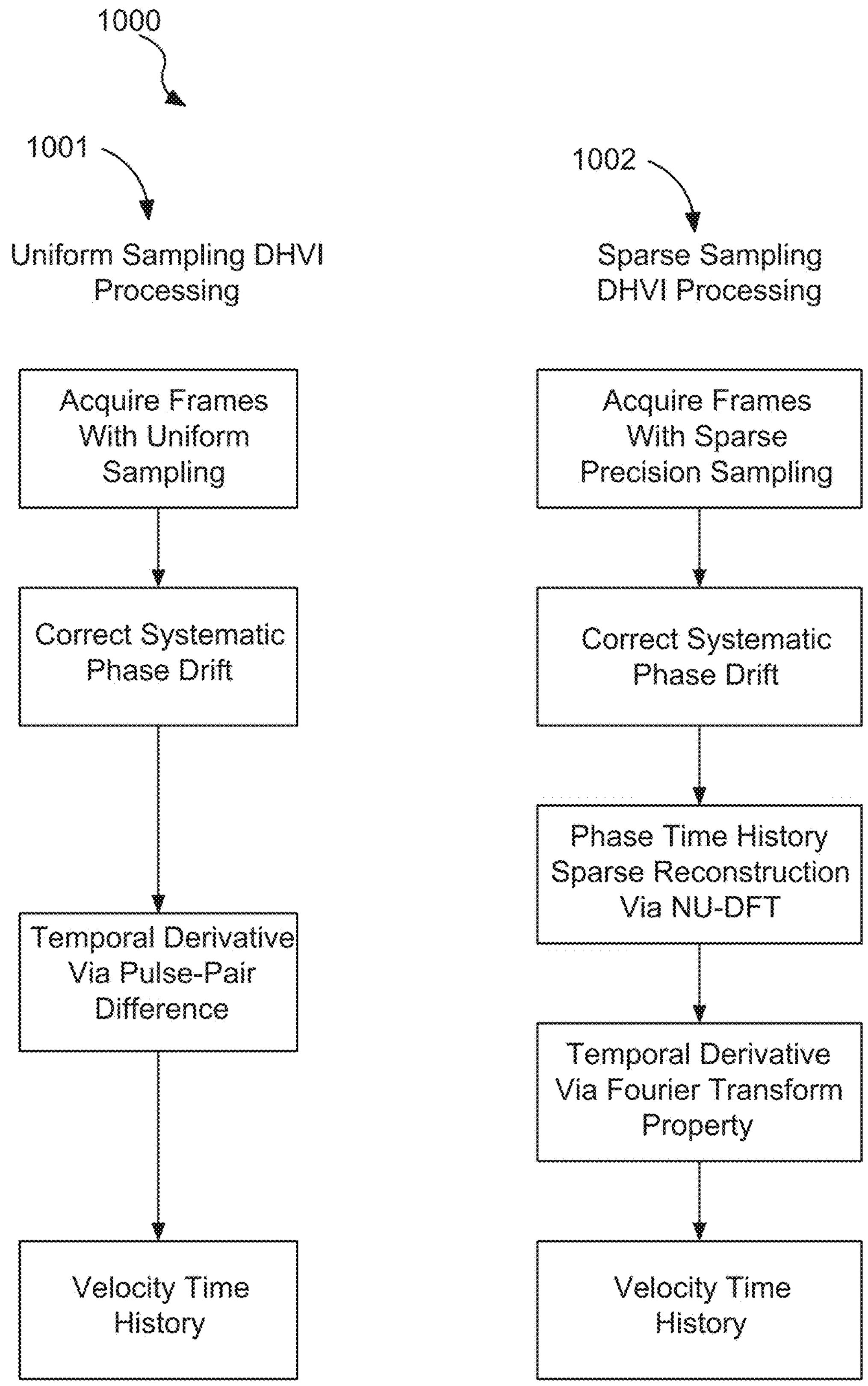
FIG. 10 shows a schematic depiction of the uniform and sparse digital holographic velocity image processing flow according to embodiments of the present disclosure.

FIG. 10 shows example embodiments of pulse-pair processing 1000, including a process 1001 for uniform sampling, and a process 1002 for sparse precision temporal sampling. For process 1001, per Eq. (2), the velocity time history for the uniformly sampled data is calculated directly from the difference between adjacent pulses. In this approach, velocity estimates are limited to the Nyquist bandwidth of the frame rate. Although the effective bandwidth of the sparse signal is increased, the conventional pulse-pair processing 1001 is not applicable since the direct difference between adjacent samples would be aliased for high frequency signals again limiting the signal bandwidth to FR/2.

The pulse-pair algorithm 1002 is modified to avoid this issue. The phase signal $\phi(x,y;t_n)$ which is again calculated from the series of complex frames as $$\begin{aligned}\varphi(x, y; t_n) &= \frac{1}{2k} \angle\{S(x, y; t_n)\} \\ &= \frac{1}{2k} \angle\left\{A(x, y; t_n) e^{(j\varphi(x,y;t_n))}\right\}\end{aligned} \tag{4}$$

where k is the wave number of the laser, and $t_n$ is the time of the $n^{th}$ sparsely sampled frame. The phase series is sparse with frame time measured to precision $T_{int}$ but measurements separated on average by $T_s=1/FR$. For the sparse data, the phase spectra, $\phi(x,y;t_n)$, is estimated using for the non-uniform sampling using the non-uniform discrete Fourier transform of type II (NUDFT-II) as $$\Phi(\omega_k) = \sum_{n=0}^{N-1} A_n \varphi_n e^{-j2\pi t_n \omega_k} \tag{5}$$

where $A_0 \ldots, A_{N-1}$ are the amplitudes, $\phi_0 \ldots, \phi_{N-1}$ and phases, $t_0 \ldots, t_{N-1}$ are the measurement times, $\omega_0 \ldots, \omega_K$ are the frequencies over which the transform is to be calculated. The vibration spectra is then calculated via pulse-pair difference utilizing the Fourier transform differentiation property $$\frac{d}{dt} f(t) \leftarrow \mathfrak{F} \rightarrow = (j\omega)\, X(\omega) \tag{6}$$

The sparse velocity spectra estimate is then $V(x,y;\omega_k)$ $$V(\omega_k) = (j\omega_k)\ \Phi(\omega_k) \tag{7}$$

Figure 11:
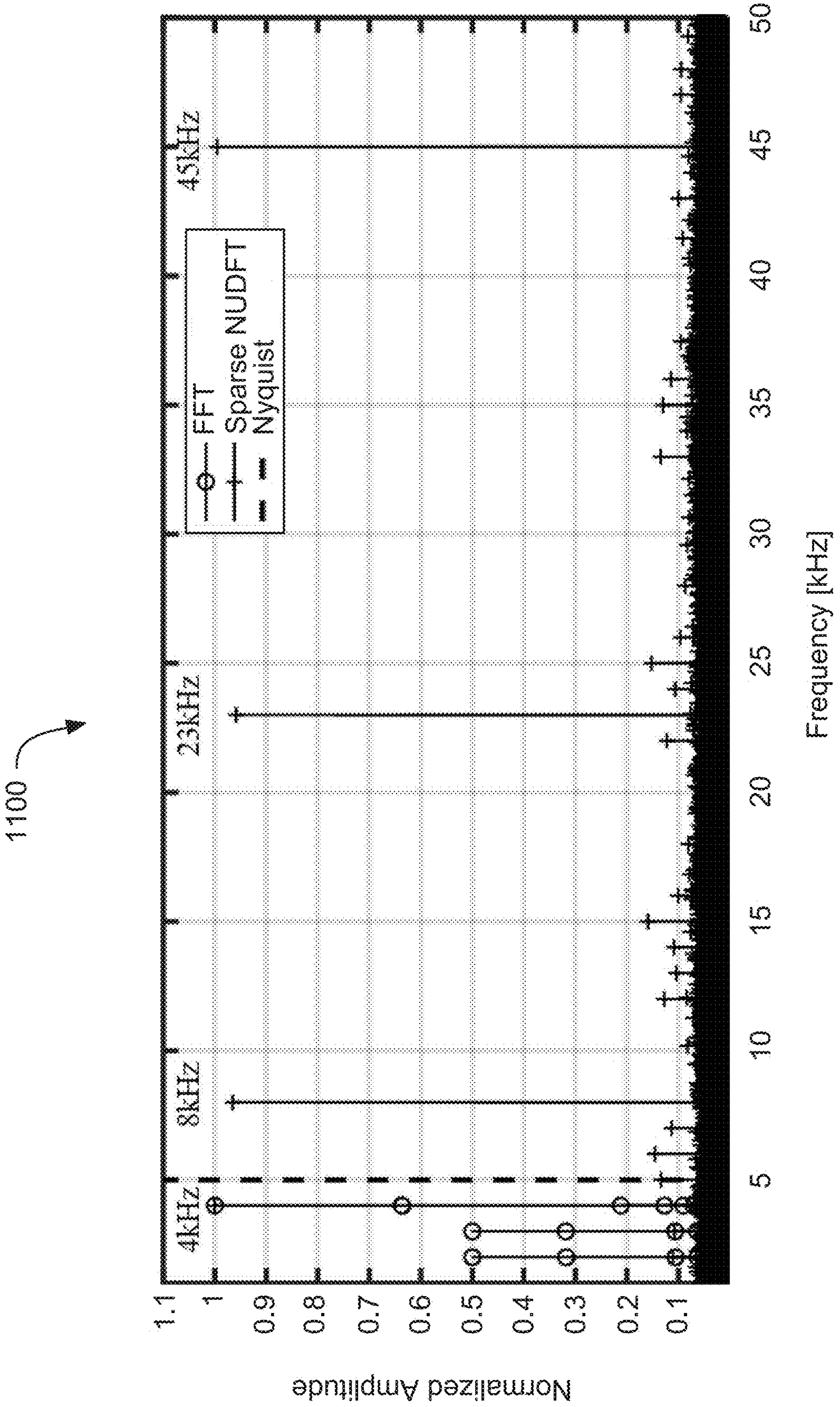
FIG. 11 shows example spectra comparing uniform and sparse sampling processes.

The configurations set forth herein were evaluated for both linear and photon counting focal plane array (FPA) implementations, using uniform sampling, sparse high precision sampling, and a high sampling rate data (for reference). The quadrature methods were also simulated in imaging modes. FIG. 11 depicts illustrative data 1100 demonstrating the increased bandwidth performance for a system with a nominal frame rate of 10 kHz, by comparing the uniform and sparse sampling results. The example signal contains four sinusoids at 4, 8, 23, and 45 kHz. For the uniform sampling data, the Nyquist frequency is 5 kHz so only the 4 kHz tone is correctly measured. The higher frequency signals for the uniform sampling are all aliased down into the frequencies below 5 kHz. In contrast, with sparse measurement precision of $T_I$, the sparse reconstructions accurately estimate the frequencies in the examples, achieving a resolution of nearly 10 times the frame rate Nyquist limit.

Depending upon the ratio of Ts to TI, frequency detection can be enhanced by a significant factor, typically between about 30× and 50×. In certain embodiments, even greater improvement can be achieved utilizing shorter pulses that can be faster than the TI value, and thereby improve the frequency resolution to a value even greater than the Ts to TI ratio. In such systems, the local oscillator (LO) and the transmit pulse should be short and have some overlap. Accordingly, in such systems a high capability high precision timer (e.g., precision timer 515, 715) will typically be the limiting factor for the upper limit of frequency detection. The rate and precision required for the timer is readily determined, in view of the present disclosure, based upon the transmit pulse duration required for the frequency values to be detected, and further utilizing the integral sparse precision sampling processing operations set forth herein.

Figure 12:
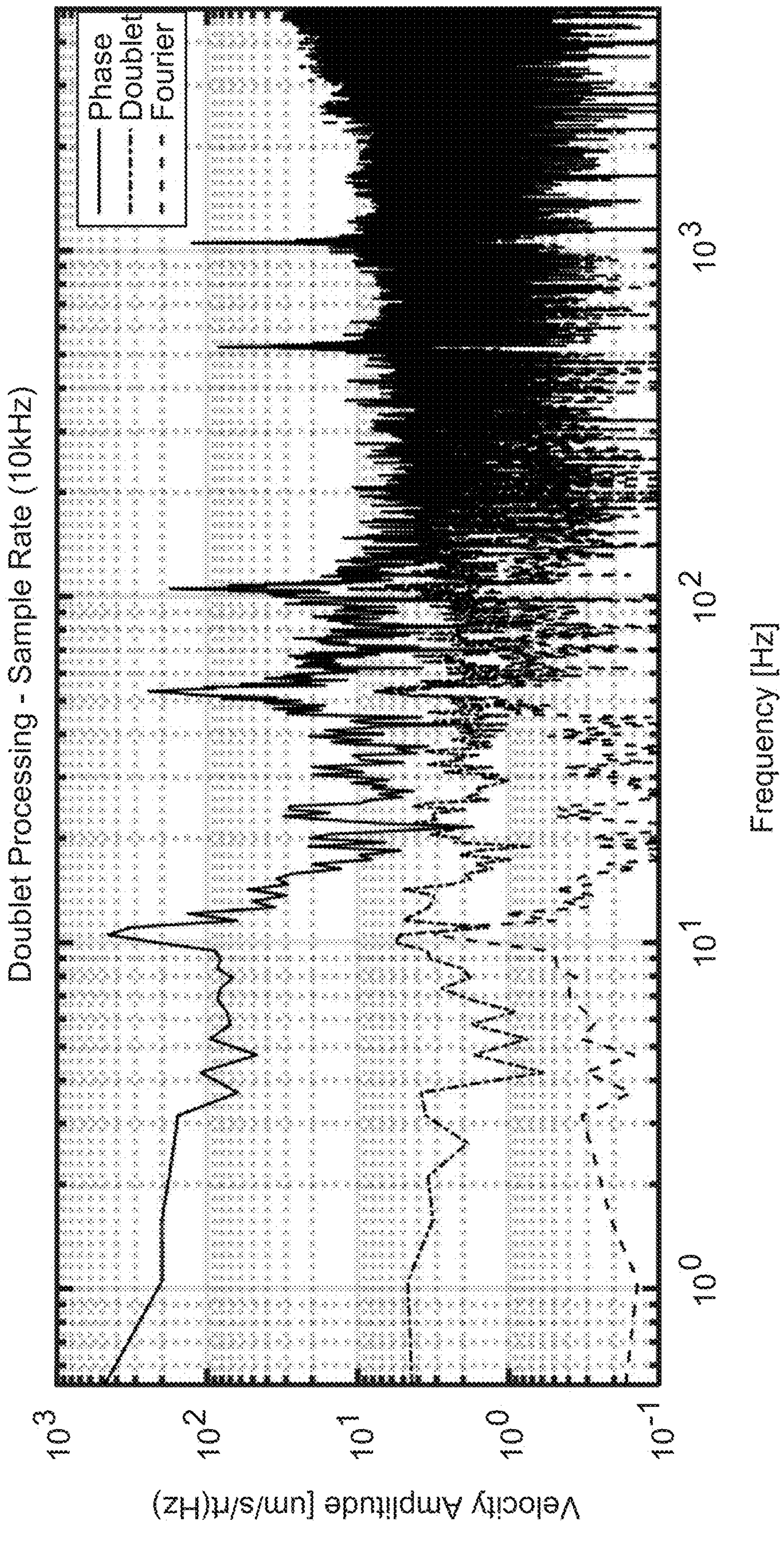
FIG. 12 shows a comparison of example phase, uniform sampling processing, and sparse Fourier processing.

Referencing FIG. 12, illustrative data is depicted showing a comparison of sparse phase processing ("Phase"), pulse-pair vibration processing at increased sampling bandwidth ("Doublet"), and the modified sparse pulse-pair velocity processing ("Fourier"). The modified sparse pulse-pair velocity processing exhibits a significantly increased noise floor, especially at low frequency, since it omits the temporal differencing that exhibits significant contributions from low frequency drift. The sparse sampling result provides excellent noise performance similar to, and even slightly better than, the high uniform sampling rate direct pulse-pair result. The high uniform sampling rate direct pulse-pair result is included for reference and comparison, as such a system may be prohibitively expensive to implement in a non-laboratory or commercial device.

The methods and systems described herein may be deployed in part or in whole through a machine having a computer, computing device, processor, circuit, and/or server that executes computer readable instructions, program codes, instructions, and/or includes hardware configured to functionally execute one or more operations of the methods and systems herein. The terms computer, computing device, processor, circuit, and/or server, ("computing device") as utilized herein, should be understood broadly.

An example computing device includes a computer of any type, capable to access instructions stored in communication thereto such as upon a non-transient computer readable medium, whereupon the computer performs operations of the computing device upon executing the instructions. In certain embodiments, such instructions themselves comprise a computing device. Additionally or alternatively, a computing device may be a separate hardware device, one or more computing resources distributed across hardware devices, and/or may include such aspects as logical circuits, embedded circuits, sensors, actuators, input and/or output devices, network and/or communication resources, memory resources of any type, processing resources of any type, and/or hardware devices configured to be responsive to determined conditions to functionally execute one or more operations of systems and methods herein.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g., where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

The methods and systems described herein may transform physical and/or or intangible items from one state to another. The methods and systems described herein may also transform data representing physical and/or intangible items from one state to another.

The methods and/or processes described above, and steps thereof, may be realized in hardware, program code, instructions, and/or programs or any combination of hardware and methods, program code, instructions, and/or programs suitable for a particular application. The hardware may include a dedicated computing device or specific computing device, a particular aspect or component of a specific computing device, and/or an arrangement of hardware components and/or logical circuits to perform one or more of the operations of a method and/or system. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

Thus, in one aspect, each method described above, and combinations thereof, may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the disclosure has been disclosed in connection with certain embodiments shown and described in detail, various modifications and improvements thereon will become readily apparent to those skilled in the art. Accordingly, the scope of the present disclosure is not to be limited by the foregoing examples but is to be understood in the broadest sense allowable by law.

What is claimed is:

1. A vibration image measurement system comprising:

a stable laser light source for master reference in a Doppler vibrometer scheme;

a camera configured to receive scattered light from a target and a spatially offset reference beam;

a precision timer for acquisition control and data registration, wherein the precision timer is configured to trigger image acquisition at precision times randomly distributed around a maximum frame rate to create a sequence of sparsely spaced pupil plane images;

an optical encoder configured to insert precision timing data into each image frame, wherein the precision timing data includes the precision times randomly distributed around the maximum frame rate and is encoded optically within each image frame as at least one of a digital signal, an analog signal, or a ratiometric signal;

an acquisition system configured to acquire the pupil plane images from the camera, the images including the precision timing data;

an image processor configured to demodulate light from the acquired images via a digital holographic scheme, and to perform pulse-pair Doppler processing to determine vibration of the target; and optics configured to direct light from the light source to illuminate the target, to provide the reference beam, and to mix the reference beam with the received scattered light for holographic detection.

2. The vibration image measurement system of claim 1, wherein the image processor is further configured to perform digital holographic detection and demodulation to create complex images containing an amplitude and a phase for each image location.

3. The vibration image measurement system of claim 1, wherein the precision timer is configured to generate camera frame acquisition signals with temporal precision equal to an integration time, and at a maximum frame rate.

4. The vibration image measurement system of claim 1, wherein the precision timing data is encoded optically within each image as the digital signal, and the digital signal comprises a signal selected from: direct binary, gray code, or 2 dimensional pattern.

5. The vibration image measurement system of claim 1, wherein the precision timing data is encoded optically within each image as the digital signal, and the digital signal comprises an optimized optical readout format.

6. The vibration image measurement system of claim 1, wherein the precision timing data is positioned in areas of the image frame blocked by a holographic aperture field stop.

7. The vibration image measurement system of claim 1, wherein the image processor is further configured to perform holographic imaging to extract a complex image with amplitude and phase.

8. The vibration image measurement system of claim 1, wherein the image processor is further configured to perform sparse pulse-pair Doppler processing to extract a phase signal from each location within a complex data volume.

9. The vibration image measurement system of claim 1, wherein the image processor is incorporated in the camera.

10. The vibration image measurement system of claim 1, wherein the image processor is further configured to perform holographic detection in an image plane.

11. The vibration image measurement system of claim 1, wherein the light source to illuminate the target comprises an amplified laser.

12. The vibration image measurement system of claim 1, wherein the image processor is further configured to measure and correct systematic phase perturbations.

13. The vibration image measurement system of claim 1, wherein the light source to illuminate the target comprises a pulsed laser.

14. The vibration image measurement system of claim 1, wherein the camera provides precision timing, and wherein the image processor is further configured to perform holographic detection in an image plane.

15. The vibration image measurement system of claim 1, wherein the optical encoder is further configured to encode the precision timing data within each image frame as an analog signal.

16. The vibration image measurement system of claim 1, wherein the optical encoder is further configured to encode the precision timing data within each image frame as a combination of analog and optical signals.

17. A system, comprising:

a stable laser light source for master reference in a Doppler vibrometer scheme;

a camera configured to receive scattered light from target and a spatially offset reference beam;

a precision timer for acquisition control and data registration, wherein the precision timer is configured to trigger image acquisition at precision times randomly distributed around a maximum frame rate to create a sequence of sparsely spaced pupil plane images;

a means for encoding precision timing data into each image frame, wherein the precision timing data includes the precision times randomly distributed around the maximum frame rate and is encoded optically within each image frame as at least one of a digital signal, an analog signal, or a ratiometric signal; and a means for determining vibration information of the target, wherein the vibration information includes vibration modes at a frequency exceeding F/2, wherein F is a frame rate of the camera.

18. The system of claim 17, wherein the means of determining vibration information of the target comprises a means for determining vibration information at a rate up to $1/2T_I$, wherein $T_I$ comprises an integration time of the camera.

19. The system of claim 17, wherein the means of determining vibration information of the target comprises a means for determining vibration information at a rate between 30× and 50×, wherein x is F/2.

20. The system of claim 17, wherein the precision timer comprises a high rate high precision timer, and wherein the means for determining vibration information of the target comprises:

a means for providing a short illumination pulse; and a means for determining vibration information at a rate between 50× and 100×, wherein x is F/2.

* * * * *